Figure 6:
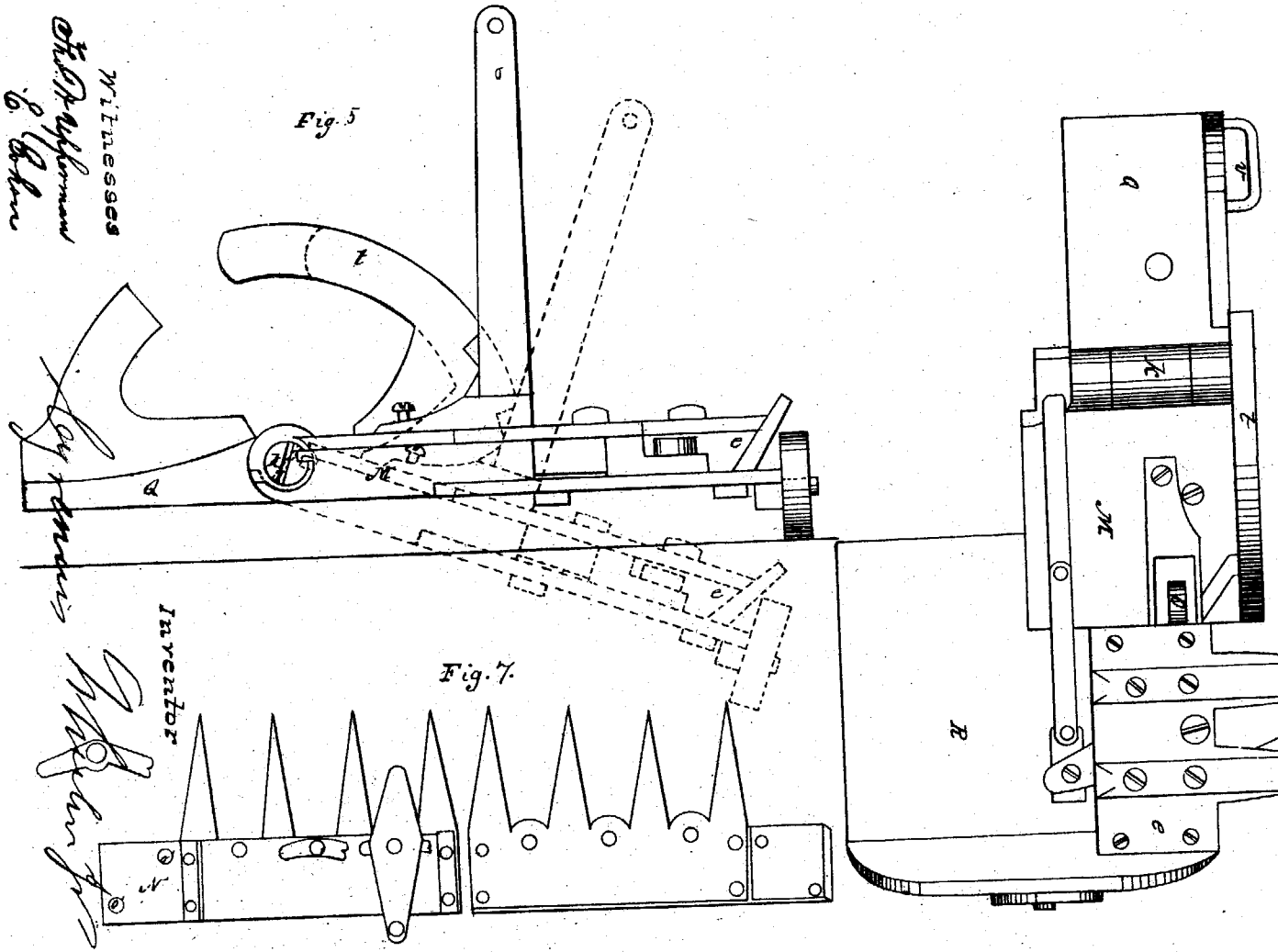

3 Sheets
Sheet 1.
C. Wheeler Jr.
Mower.
№ 878 Reissued Jan. 3, 1860.
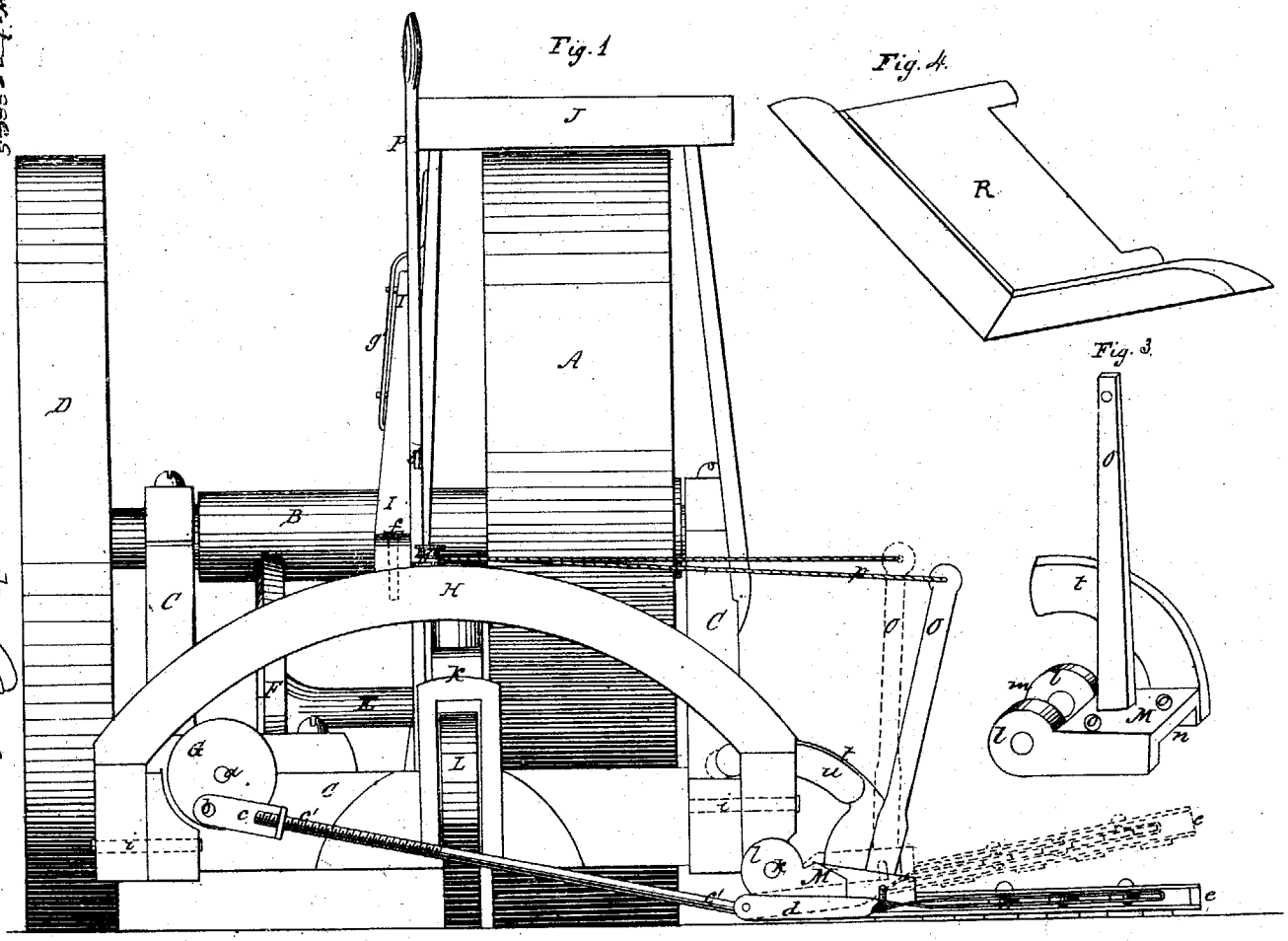
Witnesses
Fred. A. Kipperman
E. Cohen
Inventor
Cyrenius Wheeler Jr.
THE NORRIS PETERS CO., WASHINGTON, D. C.

3 Sheets
Sheet 2
C. Wheeler Jr.
Mower.
№ 878 Reissued Jan. 3, 1860.
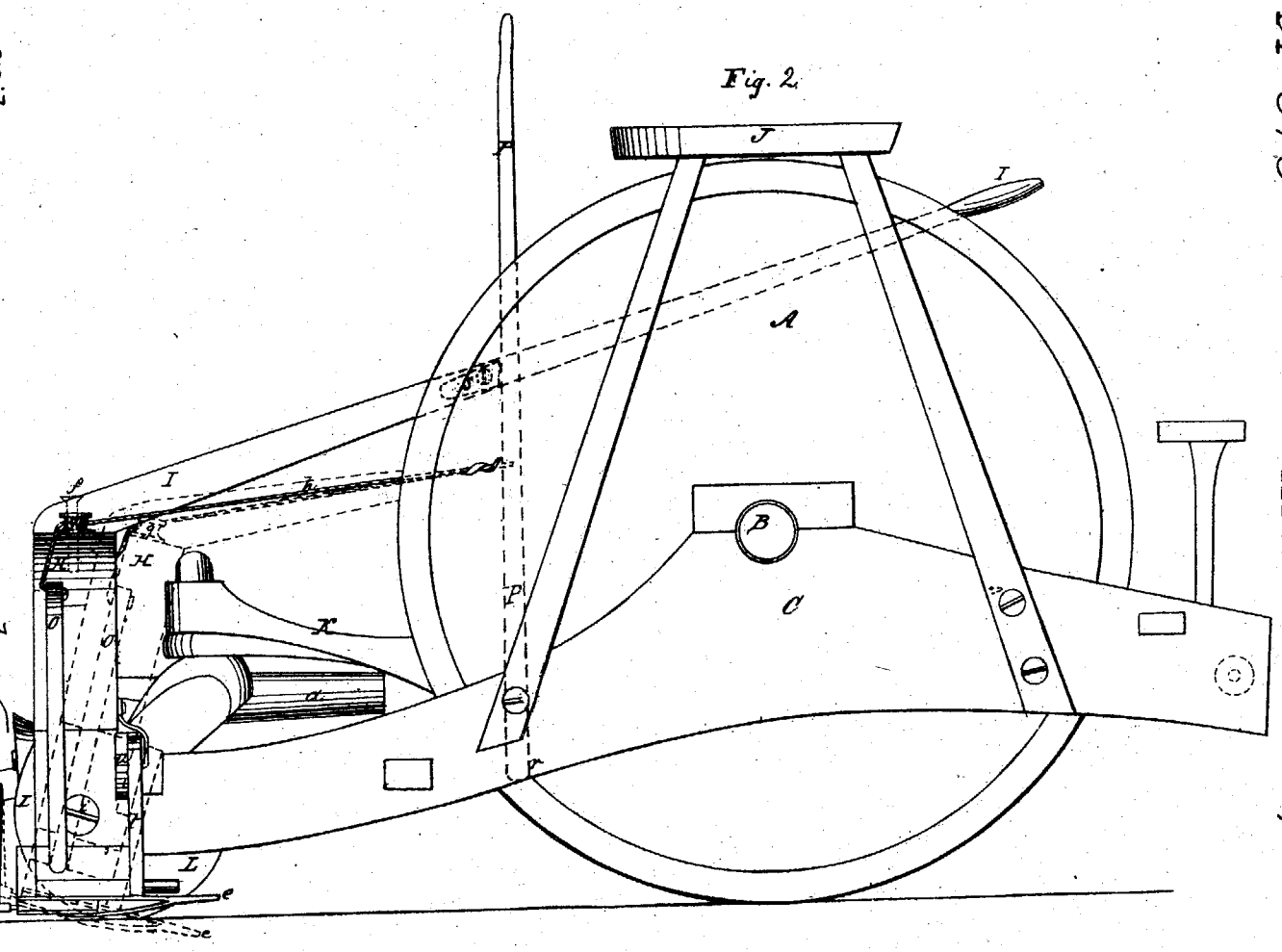
Witnesses
Th. P. Uffenman
E. Cohen
Inventor
Cyrenus Wheeler Jr
THE NORRIS PETERS CO., WASHINGTON, D. C.

3 Sheets
Sheet 3

C. Wheeler Jr.

Mower.

No 878

Reissued Jan. 3, 1860

Witnesses
Th. A. Lefferman
C. Cohen

Inventor
Cyrenius Wheeler Jr

THE NORRIS PETERS CO., WASHINGTON, D. C.

UNITED STATES PATENT OFFICE.

CYRENUS WHEELER, JR., OF POPLAR RIDGE, NEW YORK.

IMPROVEMENT IN GRAIN AND GRASS HARVESTERS.

Specification forming part of Letters Patent No. 12,044, dated December 5, 1854; Reissue No. 878, dated January 3, 1860.

DIVISION D.

*To all whom it may concern:*

Be it known that I, CYRENUS WHEELER, Jr., of Poplar Ridge, in the county of Cayuga and State of New York, have invented certain new and useful Improvements in Grain and Grass Harvesters; and I do hereby declare the following to be a full, clear, and exact description of the same, reference being had to the accompanying drawings, making a part of this specification, in which—

Figure 1 represents a rear elevation of a harvesting-machine arranged for cutting grass. Fig. 2 represents an elevation thereof, taken from the right-hand or grain side of the machine. Figs. 3 and 4 represent detached portions thereof. Figs. 5 and 6 represent respectively and on an enlarged scale the finger-bar and shoe and the hinge-joint connecting them together. Fig. 7 represents a finger-bar and cutting apparatus connected thereto.

Similar letters of reference, where they occur in the separate figures, denote like parts of the machine in all of them.

In a grass-mowing machine the finger-bar of which receives all its vertical movements from the ground over which it is drawn, while its forward movement is derived from the main frame, it is highly important that some means should be devised by which the points of the fingers can be raised or lowered, or so that the finger-beam may oscillate around its longitudinal axis in addition to its rising-and-falling motion.

To effect this purpose is the object of this part of my invention; and it consists in so hinging a short finger-bar to a brace or piece, that is in turn hinged to the main frame, as that said finger-bar may rock or roll in the line of its length, and at the same time follow the undulations of the ground over which it passes.

To enable others skilled in the art to make and use this invention, I will proceed to describe the same with reference to the drawings.

A represents a main supporting and driving wheel fast on the axle B, and D an auxiliary supporting-wheel on the same axle, but loose thereon. C is a main frame, supported on the axle B in any of the usual well-known ways. At that end of the main frame at which the finger-bar is to be connected I connect an arm, brace, or bar, H, by a hinged joint, *i*, around which it may move, said hinge-joint being above the line of the cutter-bar, and to this arm, brace, or bar H is hinged, as at *k*, the piece M, to which the cutter-bar is firmly attached, so that the cutter-bar may freely rise and fall by its hinged joint *k* and rock or oscillate in the line of its length by means of the pivot or hinge *i*, and thus the cutter may receive the combined motions incident to the two hinged or pivoted points *i k*, by which it is attached to the main frame. Of course proper devices should be connected with the bar, brace, or piece H and to the cutter-bar to restrict these motions when it is desired to do so. I have shown such devices in the drawings; but they do not enter into the subject-matter claimed in this invention.

Having thus fully described the nature and object of this invention, what I claim in this patent is—

A short finger-bar so hinged by one of its ends only to an arm, brace, or support, that is in turn hinged to the main frame in or near the line of the finger-bar, as that said finger-bar may rock or roll in the line of its length as well as rise and fall in a line transverse thereto by being simply drawn over the ground, substantially as described.

CYRENUS WHEELER, JR.

Witnesses:
THOS. H. UPPERMAN,
E. COHEN.